United States Patent Office 3,105,010
Patented Sept. 24, 1963

3,105,010
STEROID-AMINO ACID COMPOSITIONS FOR PREVENTING NEGATIVE NITROGEN BALANCE
Preston L. Perlman, Essex Fells, N.J., assignor to Schering Corporation, Bloomfield, N.J., a corporation of New Jersey
No Drawing. Filed June 19, 1959, Ser. No. 821,352
12 Claims. (Cl. 167—77)

The present invention relates to the treatment of inflammatory diseases, and in general of diseases resulting from adrenocortical hormone deficiency, and to therapeutic compositions for use in such treatment.

It is the general object of the invention to provide improved therapeutic compositions and a method of treatment, whereby negative nitrogen balances, with or without concurrent negative calcium and/or phosphorus balances during continued adrenocorticoid therapy is prevented or eliminated.

More specifically, it is an object of the invention to provide a therapeutic composition containing one or more adrenocorticoid substances together with a nutritive supplement which acts to meet any increased requirement of essential amino acids and/or makes up for any increased loss of amino acids resulting from the adrenocorticoid therapy.

A further object of the invention is to provide a therapeutic composition in the form of a tablet containing a full or fractional daily dose of the adrenocorticoid hormone mixed with a sufficient quantity of one or more essential amino acids and of a vitamin supplement to insure against the development of a negative balance, particularly of nitrogen.

Other objects and advantages of the invention will become evident from the more detailed description thereof hereinafter.

It is known that corticoid administration leads in many instances to a negative nitrogen balance, and that the negative balance is frequently associated with negative balances of certain other tissue components, such as calcium and phosphorus. These observations have been variously interpreted as evidence for (1) a catabolic or (2) an anti-anabolic effect of the corticoid; and indeed, in the opinion of some investigators, the metabolic consequences of true anti-inflammatory steroids must of necessity include these negative metabolic balances.

It has been attempted to overcome these negative balances by the simultaneous administration of anabolic steroids like testosterone propionate, methyl testosterone, "Nilevar" (17α-ethyl-19-nortesterone), and the like, and by feeding the patient a high protein diet. However, the use of anabolic steroids for this purpose has serious objections, because of the danger of malignancy, or the aggravation of an existing malignancy, the appearance of opposite secondary sex characteristics, and the like; while a heavy protein diet, in addition to not being always effective, is open to the objection, first, that many older patients do not have the appetite necessary for the ingestion of added quantities of food, and secondly, many patients find such a diet too burdensome an expense.

My observations have indicated that the corticoid substance in some manner blocks the normal utilization of essential amino acids, so that, as I have found, more of such acid or acids is required to maintain the normal anabolic functions of the body. It appears that the corticoid either directly prevents normal utilization or accelerates the catabolic decomposition of the essential amino acids.

I have found that this blocking or catabolic action of corticoids on the utilization or effectiveness of the essential amino acids can be overcome by the administration of one or more of such essential amino acids along with the corticoid, and that for best results there should be administered also a vitamin supplement containing at least certain members of the B-complex, and vitamin C, although other vitamin or vitamin-like substances may likewise be included, like vitamin A and folic acid. It will be understood that these essential amino acids are administered with the corticoid and vitamin supplement even though the diet of the patient is such that it should normally supply the amino acids and vitamins required by the body for protein anabolism and other vital functions. The negative nitrogen balance is usually accompanied also by calcium and phosphorus deficiencies and I have found that the administration of the individual essential amino acid or acids corrects also such deficiencies.

The administration of individual essential amino acids in accordance with the present invention is to be distinguished from the use of the usual protein supplements or protein hydrolysates. Aside from the fact that these protein supplements or protein hydrolysates consist by far, for the most part, of substances other than essential amino acids, these substances appear to interfere with the proper utilization of such essential amino acids as the known preparations contain. The essential acid or acids employed in the present invention, on the other hand, are the substantially pure, more or less isolated compounds, and usually the synthetically prepared acids. Because they are undiluted with inactive material, a more intensive and more easily controllable coaction with the steroid is obtained.

I have found further that certain non-essential amino acids appear to act as synergists for the essential amino acids; or it may be that the catabolic activity of the corticoid is expended first on the non-essential amino acids before the normal action of the essential acids is interfered with to any substantial extent.

Experiments conducted on dogs and man have shown that the concomitant administration of one or more essential amino acids has prevented the appearance of a negative nitrogen balance under conditions which otherwise would have produced such negative balance. Thus, whereas previous administration of prednisolone had produced a negative nitrogen balance in the dog, the simultaneous administration of 2 to 4 grams of methionine per day, administered orally to dogs weighing 10 to 15 kilograms, was completely effective in abolishing the negative nitrogen and calcium balance induced by the corticoid; and to all appearances there was no difference in the response obtained with the methionine as compared with an anabolic steroid like testosterone propionate. My investigations have shown that an equivalent amount of the non-essential amino acid glycine cannot be substituted, at least not to a large extent, for the methionine for reversing the negative metabolic balance induced by corticoids.

Tests on human beings have shown that 10 mg. of prednisolone t.i.d. promptly induced a negative nitrogen balance. On the other hand, when the corticoid was administered in combination with a lysine-vitamin preparation (Ceroforte—White Laboratories) containing the equivalent of 250 mg. lysine t.i.d., there was produced a prompt and striking change of the negative nitrogen balance to normal, or rather the development of a negative nitrogen balance was prevented which would normally be induced by the administration of the same quantity of prednisolone.

Among the other essential amino acids that may be employed in the compositions of the present invention are L-leucine, L-isoleucine, L-phenylalanine, L-threonine, L-tryptophane, and L-valine. Non-toxic, non-essential amino acids that may be utilized include L-alanine, L-arginine, L-aspartic acid, L-citrulline, L-cystine, glutamic acid, glycine, L-histidine, L-hydroxyproline, L-proline, L-serine, and L-tyrosine.

The dosage of most of the amino acids can vary from about 250 mg. to as much as 2 or 3 g. or more per day, depending upon the needs of the patient. Where two or more of the essential amino acids are used, the amounts of each can be reduced in comparison with the single acid dosage. As the body's needs for L-threonine and tryptophane are lower than for other acids, the quantity of these acids can likewise be reduced; thus, in the case of threonine, about 250 mg. to 600 mg. per day is ordinarily sufficient, while for tryptophane the daily dosage can amount to about 200 mg. to 400 mg.

The quantity of the non-essential amino acids is not critical but where they are employed in amounts at least equal to that of the essential amino acid or acids, the dosage of the latter can be reduced by about 10 to 20% or even more.

While I have obtained satisfactory results by the use of single essential amino acids, it will be of advantage in certain cases to employ a mixture of two or more such acids, with or without a quantity of non-essential amino acids. Hence, various combinations of two, three or more amino acids may be employed, and the daily dosage will depend on the needs of the patient. Thus, in the case of a sick patient unable to digest protein foods, larger amounts of the amino acids can be administered. By way of example, L-isoleucine may be administered along with L-threonine, or L-leucine with L-valine, or L-phenylalanine can be administered along with smaller proportions of L-threonine and L-tryptophane, together with the corticoid.

The essential amino acid or acids are preferably administered orally along with the corticoid hormone material; however, the acid or acids can be administered also intravenously, substantially simultaneously with the oral corticoid administration, or both can be administered intravenously.

The adrenocorticoid substances employed in the compositions of the present invention are those of the 11-oxygenated compounds. These include corticosterone and dehydrocorticosterone, cortisone, hydrocortisone and the analogous compounds of the 1,4-pregnadiene series and their 21-esters and nuclearly substituted derivatives, for example, prednisone, prednisolone, 6α-methyl-prednisone and -prednisolone, 16α-methyl-prednisone and -prednisolone, 16β-methyl-prednisone and -prednisolone, 16α-hydroxy-prednisone and -prednisolone, 16β-hydroxy-prednisone and -prednisolone, and the 9α-fluoro and chloro derivatives, and the non-toxic 21-esters of all of these compounds, particularly 16α-methyl-9α-fluoro-prednisone and -prednisolone, 16β-methyl-9α-fluoro-prednisone and -prednisolone, 16α-hydroxy-9α-fluoro-prednisone and -prednisolone, and 6α-methyl-9α-fluoro-prednisone and -prednisolone.

These compounds, particularly cortisone, hydrocortisone, their 1-dehydro derivatives and the nuclear substitution products of all of these compounds, have been employed as anti-inflammatory agents in the treatment of rheumatoid arthritis and other adrenal insufficiency diseases and also in the treatment of leukemia and other forms of cancer.

The 21-esters can be of any of the acids usually employed or suggested for the esterification of the 21-hydroxyl group of cortical steroids. These acids include the lower alkanoic acids having up to about 8 carbon atoms, such as acetic, propionic, butyric and valeric acid, cycloaliphatically substituted lower alkanoic acids, such as the cyclopentyl and cyclohexyl acetic and propionic acid, the half esters of alkanedioic acids, like malonic, succinic and adipic acid and their sodium or other non-toxic metal salts, branch chain acids like t-butyl acetic acid, aromatic acids like benzoic and phthalic (which latter can be employed to produce half esters and also soluble metal salts of such half esters), and the like.

The following are examples of compositions prepared in accordance with the invention, but it is to be understood that they are presented by way of illustration only and not as indicating the scope of the invention:

Example 1

| | Mg. |
|---|---|
| Prednisolone | 8 |
| L-lysine | 250 |

The two substances are mixed with each other and with a small quantity of a suitable binder, like lactose, gelatin, or an edible gum, and pressed into a tablet. A tablet can be administered orally three times a day.

Example 2

| | Mg. |
|---|---|
| 9α-fluoro-16α-methyl prednisolone | 2 |
| L-methionine | 300 |

These materials are pressed together with a suitable binder into a tablet which can likewise be administered three times daily.

Example 3

| | Mg. |
|---|---|
| 6α-methyl prednisolone | 2 |
| L-tryptophane | 100 |
| Glutamic acid | 150 |

These materials can likewise be pressed into a tablet, one of which can be given orally three times a day.

Example 4

| | Mg. |
|---|---|
| Prednisone | 9 |
| L-lysine | 100 |
| L-methionine | 100 |

These materials are pressed into a tablet which is taken orally three times daily.

In some cases it may be desirable to administer part or all of the amino acids in the form of their soluble alkali metal or alkali earth metal salts, such as the sodium potassium, calcium or magnesium salts.

As indicated above, it will in many cases be desirable, and even necessary, to administer the corticoid-amino acid compositions together with a vitamin supplement. Of particular value are the vitamins of the B complex and ascorbic acid. The following are examples of vitamin-containing compositions:

Example 5

| | Mg. |
|---|---|
| Prednisolone | 8 |
| L-methionine | 300 |
| Thiamine | 6 |
| Riboflavin | 6 |
| Ascorbic acid | 150 |

This mixture is pressed into a tablet which is administered three times daily.

Example 6

| | | |
|---|---|---|
| 9α-fluoro-16α-methyl prednisolone | mg | 3 |
| L-lysine | mg | 600 |
| Vitamin A—U.S.P. units | | 25,000 |
| Vitamin D—U.S.P. units | | 1,000 |
| Thiamine | mg | 10 |
| Riboflavin | mg | 10 |
| Pyridoxine | mg | 2 |
| Niacinamide | mg | 100 |
| Vitamin $B_{12}$ | mcg | 4 |
| Folic acid | mg | 1.5 |
| Ascorbic acid | mg | 300 |
| Calcium pantothenate | mg | 20 |

This mixture, in the form of a tablet, can be given 1 to 3 times per day.

The mixture of corticoid substance and isolated amino acid or acids, together with the vitamin supplement when employed, can be administered also in the form of elixirs, wherein the substances are contained in such concentration that a spoonful will contain the necessary dosages of the various components.

For intravenous administration, the corticoid is provided in the form of an extremely fine powder when its solubility in water is limited; or it may be converted into a water-soluble form, for example, as the soluble salt of a 21-half-ester, as of succinic or phthalic acid. The corticoid can then be administered as a solution in a solution of the essential amino acids.

I claim:

1. A therapeutic composition comprising a mixture of an anti-inflammatory corticoid hormone capable of inducing a negative nitrogen balance effect, mixed with a larger amount of an essential amino acid component consisting of at least one but less than all of the essential amino acids.

2. A therapeutic composition comprising a mixture of an anti-inflammatory corticoid hormone capable of inducing a negative nitrogen balance effect, mixed with a larger amount of an essential amino acid component consisting of methionine.

3. A therapeutic composition comprising a mixture of an anti-inflammatory corticoid hormone capable of inducing a negative nitrogen balance effect, mixed with a larger amount of an essential amino acid component consitsting of lysine.

4. A therapeutic composition comprising a mixture of an anti-inflammatory corticoid hormone capable of inducing a negative nitrogen balance effect, mixed with a larger amount of an essential amino acid component consisting of tryptophane.

5. A therapeutic composition comprising a mixture of a member of the group consisting of cortisone, hydrocortisone, prednisone, prednisolone, their 16-alpha-methyl-9-alpha-fluoro derivatives, and 16-beta-methyl-9-alpha-fluoro-prednisone and prednisolone, and their non-toxic 21-esters, with a larger amount of an essential amino acid component selected from the group consisting of a substantially pure essential amino acid and its non-toxic salts.

6. A therapeutic composition comprising a tablet containing approximately ½ to 50 mg. of an 11-oxygenated adreno-corticoid hormone capable of inducing a negative nitrogen balance, and 100 to 600 mg. of an essential amino acid component consisting of at least one but less than all of the essential amino acids and their non-toxic salts.

7. A tablet according to claim 6, containing also a quantity of an ingestible non-essential amino acid.

8. A therapeutic composition comprising a tablet containing approximately ½ to 50 mg. of an 11-oxygenated adreno-corticoid hormone capable of inducing a negative nitrogen balance, and 100 to 600 mg. of an essential amino acid component consisting of methionine.

9. A therapeutic composition comprising a tablet containing approximately ½ to 50 mg. of an 11-oxygenated adreno-corticoid hormone capable of inducing a negative nitrogen balance, and 100 to 600 mg. of an essential amino acid component consisting of lysine.

10. The method of combating inflammatory disease while preventing the appearance of a negative nitrogen balance, which comprises administering internally substantially simultaneously an anti-inflammatory corticoid hormone capable of inducing a negative nitrogen balance and a member of the group consisting of a substantially pure essential amino acid and its non-toxic salts.

11. The method of combating inflammatory disease while preventing the appearance of a negative nitrogen balance, which comprises administering internally substantially simultaneously an anti-inflammatory corticoid hormone capable of inducing a negative nitrogen balance, and a larger amount of an essential amino acid component consisting of methionine.

12. The method of combating inflammatory diseases while preventing the appearance of a negative nitrogen balance, which comprises administering internally substantially simultaneously an anti-inflammatory corticoid hormone capable of inducing a negative nitrogen balance, and a larger amount of an essential amino acid component consisting of lysine.

References Cited in the file of this patent

Cecil et al.: Textbook of Medicine, 9th ed., November 1955, pp. 903; 1445–1447.

Physicians Desk Reference, 11th ed., 1957, pp. 375; 471; 514 and 583.

Fruton et al.: General Biochemistry, pp. 634–6 (1953).

Harrow: Textbook of Biochemistry, 5th ed., p. 114 (1950).